US011225949B2

(12) United States Patent
Whitehouse et al.

(10) Patent No.: US 11,225,949 B2
(45) Date of Patent: *Jan. 18, 2022

(54) LIGHTNING PROTECTION SYSTEMS FOR WIND TURBINE BLADES

(71) Applicant: Vestas Wind Systems A/S, Aarhus N. (DK)

(72) Inventors: Daniel Whitehouse, Gurnard (GB); Richard Baker, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,538

(22) Filed: Nov. 24, 2020

(65) Prior Publication Data

US 2021/0079895 A1    Mar. 18, 2021

Related U.S. Application Data

(63) Continuation of application No. 15/029,886, filed as application No. PCT/DK2014/050333 on Oct. 15, 2014, now Pat. No. 10,883,479.

(30) Foreign Application Priority Data

Oct. 17, 2013 (GB) ..................... 1318381

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *Y02E 10/72* (2013.01)

(58) Field of Classification Search
CPC ....... F03D 80/30; F03D 1/0675; Y02E 10/72; Y02T 50/60
See application file for complete search history.

(56) References Cited

U.S. PATENT DOCUMENTS 6,612,810 B1 * 9/2003 Olsen ............... F03D 80/30
416/95
6,979,179 B2 * 12/2005 Møller Larsen ........ F03D 80/30
416/223 R
(Continued)

FOREIGN PATENT DOCUMENTS

CN   101336342 A   12/2008
CN   101341334 A    1/2009
(Continued)

OTHER PUBLICATIONS

Intellectual Property Office, Search and Examination Report issued in Application No. GB1318381.9 dated May 22, 2014.
(Continued)

*Primary Examiner* — Woody A Lee, Jr.
*Assistant Examiner* — Brian Christopher Delrue
(74) *Attorney, Agent, or Firm* — Wood Herron & Evans LLP

(57) ABSTRACT

A blade tip assembly for a wind turbine blade, comprising a conductive blade tip module, a receptor arrangement spaced from the conductive blade tip module, a coupler that electrically couples the conductive blade tip module to the receptor arrangement and an insulating member that insulates the coupler. The invention also can be expressed as a method for assembling a blade tip assembly for a wind turbine blade, the method comprising providing a blade tip module; providing the blade tip module with a coupler for electrically coupling the blade tip module to a down conductor of a lightning protection system; and encasing the coupler with an insulating member.

28 Claims, 6 Drawing Sheets

(56) References Cited

U.S. PATENT DOCUMENTS

| | | | |
|---|---|---|---|
| 7,508,186 B2* | 3/2009 | Mortensen | H02G 13/80 324/72 |
| 7,766,620 B2 | 8/2010 | Stam et al. | |
| 8,133,031 B2* | 3/2012 | Arinaga | H02G 13/40 416/229 R |
| 8,177,509 B2* | 5/2012 | Hansen | F03D 80/30 416/146 R |
| 8,517,681 B2* | 8/2013 | Naka | F03D 80/30 416/1 |
| 9,169,826 B2* | 10/2015 | Muto | H02G 13/80 |
| 2006/0280613 A1* | 12/2006 | Hansen | H02G 13/80 416/230 |
| 2007/0081900 A1 | 4/2007 | Nies | |
| 2008/0193292 A1* | 8/2008 | Stam | F03D 1/0675 416/146 R |
| 2009/0053062 A1* | 2/2009 | Arinaga | H02G 13/40 416/146 R |
| 2009/0056968 A1* | 3/2009 | Bertelsen | F03D 80/30 174/2 |
| 2009/0139739 A1* | 6/2009 | Hansen | F03D 80/30 174/2 |
| 2009/0257882 A1 | 10/2009 | Olsen | |
| 2011/0110789 A1* | 5/2011 | Luebbe | F03D 1/065 416/241 R |
| 2011/0142678 A1 | 6/2011 | Santiago et al. | |
| 2011/0182731 A1 | 7/2011 | Naka et al. | |
| 2012/0003094 A1* | 1/2012 | Hansen | F03D 1/0675 416/146 R |
| 2012/0133146 A1* | 5/2012 | Naka | F03D 80/30 290/55 |
| 2012/0287549 A1* | 11/2012 | Tanaka | H05H 1/2406 361/131 |
| 2012/0321468 A1* | 12/2012 | Hansen | F03D 80/30 416/146 R |
| 2013/0078105 A1* | 3/2013 | Drewes | H02G 13/00 416/230 |
| 2013/0149154 A1* | 6/2013 | Kuroiwa | B29C 70/08 416/146 R |
| 2015/0308415 A1* | 10/2015 | Rajasingam | F03D 1/0675 156/196 |
| 2016/0245264 A1* | 8/2016 | Sogaard | F03D 1/0675 |
| 2017/0321661 A1* | 11/2017 | Mieritz | F03D 80/30 |

FOREIGN PATENT DOCUMENTS

| | | | |
|---|---|---|---|
| CN | 101438055 A | 5/2009 | |
| CN | 201991708 U | 9/2011 | |
| CN | 102365454 A | 2/2012 | |
| CN | 102822518 A | 12/2012 | |
| DE | 102008007910 A1 | 8/2008 | |
| EP | 1011182 A1 | 6/2000 | |
| EP | 2110552 A1 | 10/2009 | |
| EP | 2226497 A1 | 9/2010 | |
| EP | 2395239 A1 | 12/2011 | |
| EP | 2532893 A1 | 12/2012 | |
| EP | 2532893 A1 * | 12/2012 | F03D 1/0675 |
| WO | 2007062659 A1 | 6/2007 | |
| WO | 2007128314 A1 | 11/2007 | |
| WO | 2008006377 A1 | 1/2008 | |
| WO | 2011080177 A1 | 7/2011 | |
| WO | 2013084634 A1 | 6/2013 | |
| WO | 2013097855 A2 | 7/2013 | |

OTHER PUBLICATIONS

European Patent Office, International Search Report and Written Opinion issued in International Patent Application No. PCT/DK2014/050333 dated Dec. 12, 2014.

Intellectual Property Office, Search and Examination Report issued in Application No. GB1318383.5 dated Jun. 30, 2014.

Intellectual Property Office, Search Report issued in Application No. GB1318382.7 dated May 1, 2014.

European Patent Office, Extended European Search Report in EP Application No. 18188174.9, dated Feb. 27, 2019.

China National Intellectual Property Administration, First Notification of Office Action in CN Application No. 201480068823.6, dated Jan. 19, 2018.

China National Intellectual Property Administration, 2nd Notification of Office Action in CN Application No. 201480068823.6, dated Sep. 13, 2018.

* cited by examiner

LIGHTNING PROTECTION SYSTEMS FOR WIND TURBINE BLADES

CROSS REFERENCE TO RELATED APPLICATIONS

This application is a continuation of U.S. patent application Ser. No. 15/029,886, filed Apr. 15, 2016 (pending), which is a U.S. National Phase Application of International Application No. PCT/DK2014/050333, filed Oct. 15, 2014 (expired), which claimed the benefit of UK Patent Application No. 1318381.9 filed Oct. 17, 2013, the disclosures of which are incorporated by reference herein in their entirety.

TECHNICAL FIELD

The present invention relates wind turbine blade structures and associated fabrication processes for improving the resilience of wind turbine blades to lightning strikes.

BACKGROUND

Wind turbines are vulnerable to being struck by lightning; sometimes on the tower, nacelle and the rotor hub, but most commonly on the blades of the turbine. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines so that they are able to manage effectively the energy imparted to them during a lightning strike in order to avoid damage to the blade and the associated cost of turbine down-time during blade replacement.

Lightning protection systems for wind turbine blades are known. In one example, an electrically conductive lightning receptor element is arranged on an outer surface of the blade to receive a lightning strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in the hub, nacelle and tower to a ground potential. Such a lightning protection system therefore allows lightning to be channelled from the blade to a ground potential safely, thereby minimising the risk of damage. However, the discrete receptor elements are relatively complex to install during fabrication of the blade and, moreover, they leave a significant portion of blade area exposed to a risk of lightning strike.

Observation of the effects of lightning strikes on turbine blades has revealed that the highest proportion of lightning strikes happen at the blade tips. To address this, WO2005/031158 proposes a turbine blade having a solid metal tip. Although the solid metal tip provides a robust conductive body to withstand a high number of lightning strikes, in some circumstances lightning may still strike the blade in-board of the tip thereby having the potential to cause blade damage.

A further lightning protection is described in WO2013/007267, which proposes demarcating a turbine blade into a plurality of different zones, each zone being provided with a different protective measure that is selected depending on the expected impact of a lightning strike within that blade zone. Here, a high risk strike zone such as the tip can be protected with robust protection measures such as a solid metal tip, whilst protective measures in low risk strike zones can potentially be removed altogether.

It is against this context that the invention has been devised.

SUMMARY OF THE INVENTION

In a first aspect, the invention provides a blade tip assembly for a wind turbine blade, comprising a conductive blade tip module, and a coupler extending from the blade tip module for attaching the blade tip module to a down conductor, wherein an insulating member encases the coupler.

When installed in a wind turbine blade, the blade tip assembly is connectable to a down conducting system so that electrical energy from a lightning strike is channelled away from the tip to the lightning management systems installed in the tower of the wind turbine. In known conductive blade tips of wind turbines, it has been observed that lightning may be attracted to the down conducting system and other metal components in the blade just inboard of the blade tip which can cause damage to the blade. Beneficially, therefore, the blade tip assembly of the invention incorporates a receptor arrangement that is spaced from the blade tip module, but spaced from it, so that it serves to 'intercept' lightning strikes that may be disinclined to attach to the blade tip such as may occur when the blade is at horizontal orientations. The receptor arrangement that forms part of the blade tip assembly therefore provides an 'easy' electrical grounding path which guards against lightning attaching to metal components internal to the blade.

The receptor arrangement may include a conductive receptor base, for example brass, that is plate like in form and which serves as an attachment point for one or more receptor elements or bolts that punctuate the blade skin to connect to the receptor base. In one embodiment, the receptor is a plate that extends transverse (i.e., chord-wise) to the longitudinal axis of the blade tip assembly The coupler connects the blade tip module to the receptor arrangement and may be formed integral to the blade tip module. Alternatively, the coupler may be detachable from the blade tip module. Although the coupler could take various forms, in one embodiment it is a tongue-like plate that extends from the blade tip module and which is encased by the insulating member. Preferably, the insulating member is a polymeric block-like member that extends from the blade tip module and encases the coupler and the receptor arrangement. Preferably, the insulating member is moulded directly onto the coupler.

Although the conductive blade tip module may comprise a core member encased in a conductive layer, a module of solid metal provides a tougher unit that has a higher current-carrying capacity. In principle it is acceptable for the blade tip module to be made from any metal or metal alloy, although currently preferred is copper.

The coupler may comprise a tongue-like attachment plate which extends from the blade tip module and which may be integral with the blade tip module or attached to it by a suitable means, such as a set of bolts, in which case the coupler may be receivable in a cavity defined in the blade tip module.

In one embodiment, the insulating member is moulded directly to the coupler and has an outer chord-wise profile similar to that of the blade within which it is received, in use.

The relatively large size of the insulating member ensures a strong connection between the blade tip assembly and the blade.

In a preferred embodiment, the blade tip module is solid metal, and the insulating member may also encase a receptor arrangement within it.

The invention also extends to a method of assembling a blade tip assembly for a wind turbine blade, the method including: providing a blade tip module; providing the blade tip module with a coupler for electrically coupling the blade tip module to a down conductor of a lightning protection system; and encasing the coupler with an insulating member.

Advantageously, therefore, the coupler that extends from the blade tip module and serves to connect to a down conducting system is encased in an insulating member. The insulating member may be formed in a suitable shape, for example a shape that lends itself to incorporation into an internal volume of a composite blade of a wind turbine. The insulating member therefore serves as a mounting point.

Before encasing the coupler in the insulating member, the coupler may be attached to a down conductor at a suitable junction. Therefore, during blade assembly the blade tip assembly can be installed as a unit together with the down conductor which makes for more convenient manufacture.

As an alternative, a receptor base may be arranged such that it is spaced form the blade tip module and connected between the coupler and the down conductor prior to encasing the coupler, and the receptor base in the insulating member.

It will be appreciated that preferred and/or optional features of the first aspect of the invention may be combined with the other aspects of the invention, and vice versa. The invention in its various aspects is defined in the independent claims below and advantageous features are defined in the dependent claims below.

BRIEF DESCRIPTION OF THE DRAWINGS

For a fuller understanding of the invention, some embodiments of the invention will now be described with reference to the following drawings, in which.

DETAILED DESCRIPTION

Figure 1:
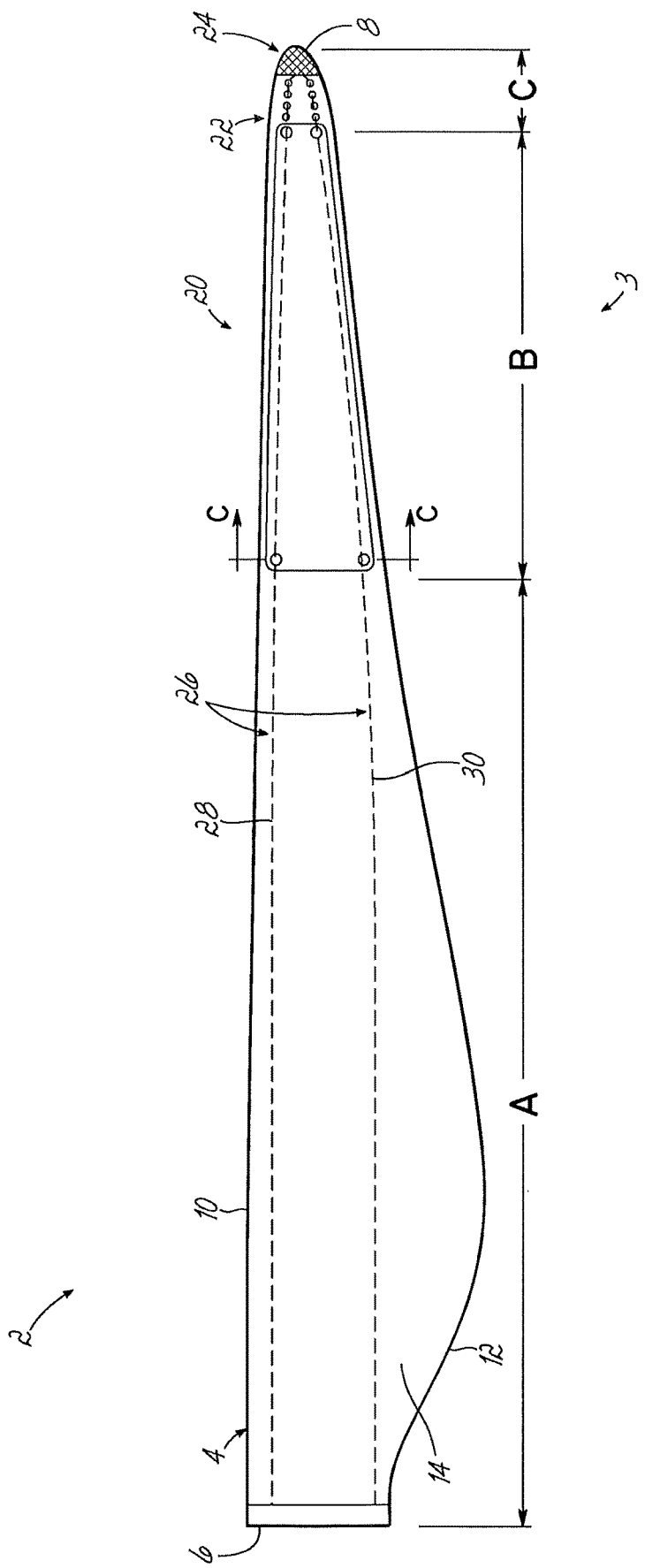
FIG. 1 is a plan view of a wind turbine blade equipped with a lightning protection system.

With reference to FIG. 1, a wind turbine blade 2 incorporates a lightning protection system 3. The blade 2 is formed from a blade shell 4 having two half-shells. The half-shells are typically moulded from glass-fibre reinforced plastic (known as 'GFRP' or, simply 'GRP') that comprises glass fibre fabric embedded in a cured resin matrix. The precise construction of the blade shell 4 is not central to the invention and so further detailed description is omitted for clarity.

The blade comprises a root end 6, at which the blade 2 would be attached to a rotor hub of a wind turbine, a tip end 8, a leading edge 10 and a trailing edge 12. A first surface 14 of the blade 2 defines an aerodynamic profiled surface that extends between the leading edge 10 and the trailing edge 12. The blade 2 also includes a second surface also extending between the leading edge 10 and trailing edge 12, which is not shown in the plan view of FIG. 1, but which is indicated as reference numeral 16 in FIGS. 3 and 4, for example.

When the blade 2 is attached to a rotor hub of a wind turbine, airflow strikes the surface 16 of the blade 2 and for this reason the surface 16 is also referred to as a 'pressure side' or 'windward side' in the art. Conversely, the surface 14 is referred to as the 'suction side' or 'leeward side'.

Turning to the lightning protection system 3, this is based on a 'zoning' concept in which the blade 2 is demarcated in a longitudinal or 'span-wise' direction into regions or 'zones' depending on the probability of receiving a lightning strike and severity of the strike in that region. A similar principle is described in WO2013/007267.

In this embodiment, the blade 2 is divided into three zones for the purposes of lightning protection—these are illustrated in FIG. 1 as zones A, B and C. The lightning protection facility that is used in each of the zones is selected based on a set of lightning strike parameters, such as peak current amplitude, specific energy, impulse shape and total charge that the blade 2 is expected to withstand in each of the zones. A brief explanation of the different zones now follows, by way of example.

Zone A extends from the root end 6 of the blade to approximately 60% of the blade length in the span-wise direction. In this zone, the blade 2 has a low risk of a lightning strike and so will be expected to receive a low incident of strikes and low current amplitudes, which is acceptable for blade structural impact. In this embodiment, the blade 2 is not equipped with any external lightning protection within this zone.

Zone B extends from the end of zone A to approximately 90% of the blade length in a span-wise direction. In this zone the blade 2 has a moderate risk of lightning strike and is expected to withstand moderately frequent direct lightning strike attachments having increased impulse current, peak current and total charge transfer. Accordingly, the blade 2 is provided with a first lightning protection sub-system 20 in the form of a surface protection layer.

Finally, zone C extends from the end of zone B to the tip end 8 of the blade 2. In this zone the blade 2 is subject to a high likelihood of lightning strikes and is expected to withstand peak current amplitudes of in excess of 200 kA and total charge transfer in excess of 300 Coulombs and, moreover, a high incident of strikes. To provide the required level of protection for the blade, zone C includes two further lightning protection sub-systems. Firstly, there is provided an array of receptors (hereinafter 'receptor array') 22 and, secondly, there is provided a blade tip assembly 24. Both the receptor array 22 and the blade tip assembly 24 are electrically connected to a down conducting system 26, comprising first and second down conductors 28, 30 running along the length of the blade 2 from the tip end 8 to the root end 6, generally being arranged adjacent the leading edge 10 and trailing edge 12 of the blade 2, respectively. Details of the receptor array 22, the blade tip assembly 24 and the down conducting system 26 will be described later.

As has been mentioned, zone B includes a surface protection layer 20 which is a conductive layer formed over the surface of, or integrated into, both the upper half-shell and the lower half-shell of the blade 2. The conductive layer 20 may be a metallic screen or mesh, but preferably an expanded metal foil that acts to attract lightning strikes over a large area of the blade and which is connected to the down conducting system 26 in a manner that will be described. The thickness of the conductive layer 20 is such that the aerodynamic profile of the blade 2 is unaffected and so it is preferred that the conductive layer is between 1 mm and 5 mm in thickness. The precise structure of the surface protection layer 20 is not central to the invention and so will not be described in further detail here.

Figure 2:
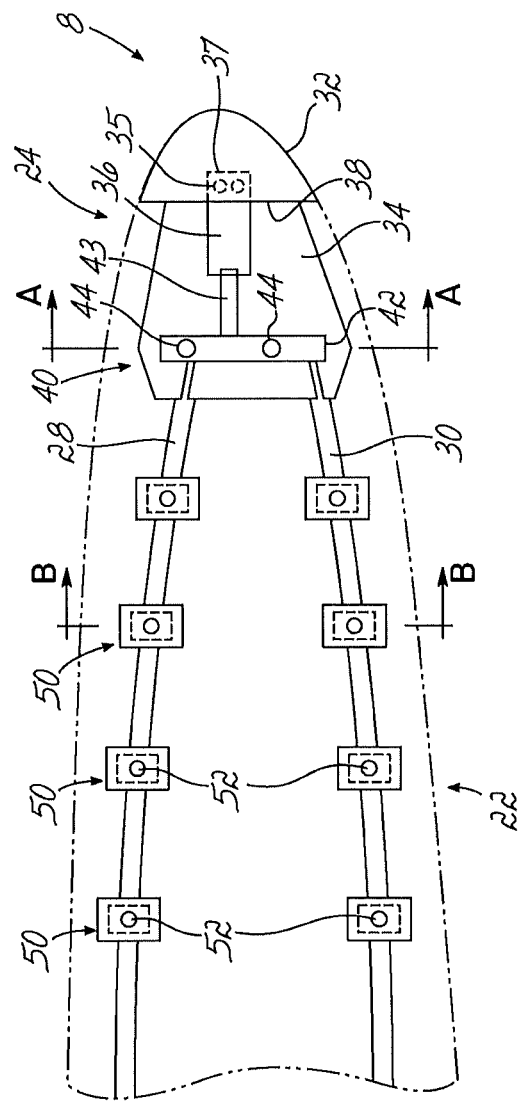
FIG. 2 is an enlarged view of a region of the turbine blade in FIG. 1, showing in more detail apparatus relating to the lightning protection system.

The blade tip assembly 24 and the receptor array 22 will now be described in more detail with reference to FIGS. 2 to 7. FIG. 2 illustrates an enlarged portion of the blade 2 in zone C and so shows the blade tip assembly 24 and the receptor array 22 in more detail. The blade 2 is shown here as having the blade tip assembly 24 attached to it. However, it should be appreciated that the blade tip assembly 24 is installable as a unit into the blade 2 during a manufacturing process.

The blade tip assembly 24 comprises a conductive blade tip module 32 and an insulating member which, in this embodiment, is a non-conductive insert member 34 coupled to the blade tip module 32. The blade tip module 32 is preferably formed from solid metal so as to provide an extremely robust lightning receptor at the very tip of the blade 2, able to withstand a high number of direct lightning attachments without suffering damage and without requiring frequent maintenance and/or inspection. The blade tip module 32 is preferably solid copper or a copper alloy such as bronze, and is cast in such a shape so as to provide an aerodynamic tip profile for the blade 2, and particularly the high curvature regions of the leading and trailing edges which are particularly attractive to lightning strike attachment. Forming the blade tip module 32 in solid metal achieves a high melting point, which is a major factor in avoiding damage during lightning strikes, and also provides good electrical conductivity into the down conducting system. It will be appreciated that metals and alloys other than copper would also be suitable.

It is preferred that the blade tip module 32 is long enough to encompass the high curvature regions of the leading and trailing edges 10, 12 of the blade, although due to the solid metal tip being of relatively high mass, it is generally an aim to design the tip to be as small as possible without reducing the ability to attract lightning to the tip. Generally, therefore, the blade tip module 32 has a length that is less than 1% of the total blade length and, more preferably, below 0.5% of the total blade length. By way of example, on a blade with a length of 60 m, the tip may be approximately 10 cm in length.

The blade tip module 32 is attached to the insert member 34 by way of a coupling member or 'coupler' 36 shown here as an attachment plate. The plate 36 has a rectangular shape and is secured by bolts 35 at one of its ends to a correspondingly shaped cavity 37 provided at an attachment face 38 of the blade tip member 32. The plate 36 is conductive and is preferably solid metal such as stainless steel, although other metals (e.g., copper) or metal alloys are acceptable.

The plate 36 provides a means by which the insert member 34 may be attached to the blade tip module 32. In this embodiment, the insert member 34 is injection moulded around the plate 36 which is placed into the mould, with or without the blade tip module 32 attached to it, prior to the start of the moulding process.

The moulded insert member 34 provides a solid base by which the blade tip assembly 24 may be incorporated into a blade 2 during a fabrication process. For example, during the lay-up of the blade, suitable blade skin and other structural components such as glass fabric layers or pre-preg materials may be arranged in a truncated blade mould that does not have a mould surface shaped to define a blade tip. The blade tip assembly 24 may then be arranged with respect to the mould such that the insert member 34 lies adjacent the prepared blade skin components and the blade tip module is located against the truncated end of the mould. In the conventional way, the insert member 34 may then be incorporated into the blade 2 during a resin impregnation process so that, following curing, the blade tip assembly 24 forms an integral part of the blade 2, the insert member 34 providing a bonding surface to hold the entire assembly in the blade shells.

In this embodiment the insert member 34 is polymeric, and it is preferred that the material has a high dielectric strength, for example in excess of 25 kV/mm which surrounds the internal metal parts with a minimum thickness of approximately 10 mm. A suitable material would be polyurethane.

As can be appreciated from FIG. 2, the insert member 34 is comparatively wide and has a width greater than 50% of the width of the corresponding section of the blade 2. The profile of the insert member 34 generally corresponds to the aerodynamic profile of the blade 2.

Since the plate 36 is removably attached to the blade tip module 32, removal and replacement of the blade tip module 32 during the life of the blade 2 is permitted. However, the plate 36 could alternatively be formed as an integral part of the blade tip module 32 during casting.

Figure 7:
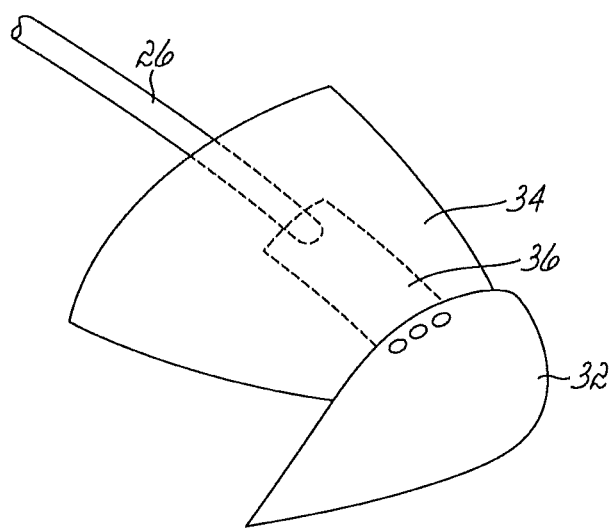
FIG. 7 is a perspective view of an alternative blade tip assembly.

In order to channel energy from a lightning strike on the blade tip module 32 to the blade root end 6, the blade tip assembly 24 is connected to the down conducting system 26. In one embodiment, as shown in FIG. 7, a single corona-inhibiting conducting cable of the down conducting system 26 is connected directly to the plate 36 by a suitable connecting method such as exothermic welding. A robust conductive coupling is therefore provided between the plate 36 and the down conducting system 26. In such an arrangement, it is preferred, although not essential, that the cable is welded to the plate 36 prior to the insert member 34 being moulded over the plate 36 in which case the cable forms a unit with the blade tip assembly 24 for the purposes of the blade fabrication process.

However, in the illustrated embodiment, the down conducting system 26 is connected to the blade tip assembly 24 in a different way. As shown in FIG. 2, the blade tip assembly 24 also includes a receptor arrangement 40 which, in this embodiment, is in the form of an elongate block-like receptor base 42 formed from a conductive material, and preferably a metallic material such as brass. The receptor base 42 extends transverse (i.e., chord-wise) to the longitudinal axis of the blade tip assembly 24 and is spaced (in a span-wise direction) from the blade tip module 32 at the far end of the insert member 34.

The receptor base 42 is electrically linked to the blade tip module 32 by a conductive link 43 which, in this embodiment, is a cable that is sheathed in a corona-inhibiting material, so as to suppress streamers and corona initiating from the cable 43. In contrast to the embodiment of FIG. 7, in this embodiment, both the first and second down conductors 28, 30 of the down conducting system 26 are directly connected to the receptor base 42. As before, preferably the down conductors 28, 30 are welded to the receptor base 42 prior to formation of the insert member 34 to encapsulate the components within it so that the insert member 34 encapsulates the plate 36 and at least part of the receptor arrangement. It will be appreciated therefore that the plate 36, the cable 43 and the receptor base 42 electrically couple the metal tip and the down conducting system 26. In principle, it should be noted that any number of electrical components could form the coupler between the tip and the down conducting system.

Figure 3:
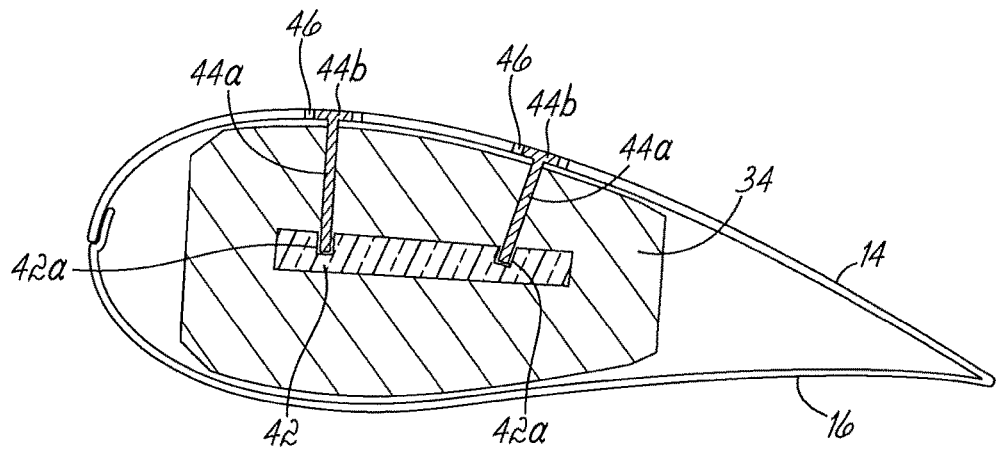
FIG. 3 is a section through the turbine blade in FIG. 2 along the line A-A.

The receptor base 42 forms a receiving point for a set of receptor elements 44 that punctuate the shell of the blade 2 and couple to the receptor base 42. As best shown in FIG. 3, the receptor elements 44 take the form of bolts having a shank 44a that extends into the blade 2 and is received into respective sockets 42a formed in the receptor base 42, and a head 44b that is countersunk into the shell so that an upper face of the head 44b sits flush with the surrounding surface of the blade 2 so as not to affect the blade aerodynamics.

In order to avoid potential 'flashovers' between the bolt head 44b and any nearby internal conductive components of the blade skin during a lightning strike, the head 44b is provided with an insulating protective collar 46, which is preferably formed from a suitable engineering plastics such as PEEK (polyetheretherketone). The protection collar additionally provides protection against collateral heat damage to the blade skin during a lightning strike to the receptor elements.

The insulating member 34 is sandwiched between an interior of the leeward surface 14 and an interior of the windward surface 16. Adhesive (not shown) is located between the insulating member 34 and the interiors of leeward and windward surfaces 14, 16 to bond the insulating member to the interior of the blade. The insulating member 34 substantially fills the hollow volume between the leeward surface 14 and the windward surface 16 at the tip of the blade. The insulating member 34 extends in a chordwise direction from the leading edge of the blade towards the trailing edge of the blade, and in a spanwise direction from the conductive blade tip 8 towards the root of the blade. In this example the insulating member 34 is a single block which encases the coupler 36 and the receptor base 42. The use of a single block means that the receptor base 42 and the coupler 36 can be provided as single module which allows for easy installation into the blade.

The receptor elements 44 are mountable on the blade 2 after it has been manufactured with the blade tip assembly 24 in position. Following completion of the blade 2, suitable apertures are created in the shell of the blade 2 and suitable tapped holes in the receptor base 42 are created for securing the receptor elements 44 in position. In order to guard against the loosening of the receptor elements 44, suitable locking means (not shown) may be provided which may take the form of a plastic pellet or patch received in a lower part of the shank 44a that engages the receptor base 42.

In this embodiment, two receptor elements 44 are provided, both on the leeward surface 14 of the blade 2. However, it will be appreciated that further receptor elements may also be provided on the leeward side of the blade 2 if desired.

From the above discussion, it will be understood that the blade tip assembly 24 provides two receptor points for lightning attachments: firstly the metal blade tip module 32 and, secondly, the receptor arrangement 40. The benefit of this is that a lightning strike will be attracted to the receptor elements 44 rather than attaching to the down conducting system 26 or other internal metal parts of the system. By way of further explanation, during the high electric field environmental conditions immediately preceding a lightning strike, the enhanced electric field at the tip of the blade 2 will induce ionization of the atmosphere and charge transfer from the blade tip module 32 thereby under certain conditions resulting in a 'space charge' surrounding the tip end 8. The existence of this space charge can in some circumstances modify the electric field around the blade tip thus deflecting the return stroke away from the conductive blade tip module 32 so that lightning attaches to conductive components within the blade, for example components of the down conducting system 26. The receptor arrangement 40 of the blade tip assembly 24 provides intentional streamer emission points adjacent to the tip and so may serve to 'intercept' the lightning strike, the lightning strike attaching properly to the receptor elements 44 and the receptor base 42 instead of attaching to other less shielded components of the blade 2. This greatly reduces the risk of blade damage at various blade angles.

Turning now to the tip receptor array 22. As has been mentioned above the blade tip assembly 24 is connected to the down conducting system 26 which comprises first and second down conducting cables 28, 30 which run the spanwise length of the blade 2 to its root end 6. The down conducting system 26 is also connected to the tip receptor array 22 of the blade 2, which will now be described in further detail.

As shown in FIG. 2, the tip receptor array 22 comprises a plurality of receptor components 50 that are distributed adjacent the leading and trailing edges 10, 12 on the leeward surface 14 of the blade 2. In this embodiment, eight receptor components 50 are provided, and each receptor component 50 is coupled to a first receptor element 52 provided on the leeward surface 14 of the blade and a second receptor element 54 provided on the windward surface 16 of the blade 2. Note that the windward receptor elements 54 are not shown in FIG. 2, but are shown in FIG. 4.

Figure 4:
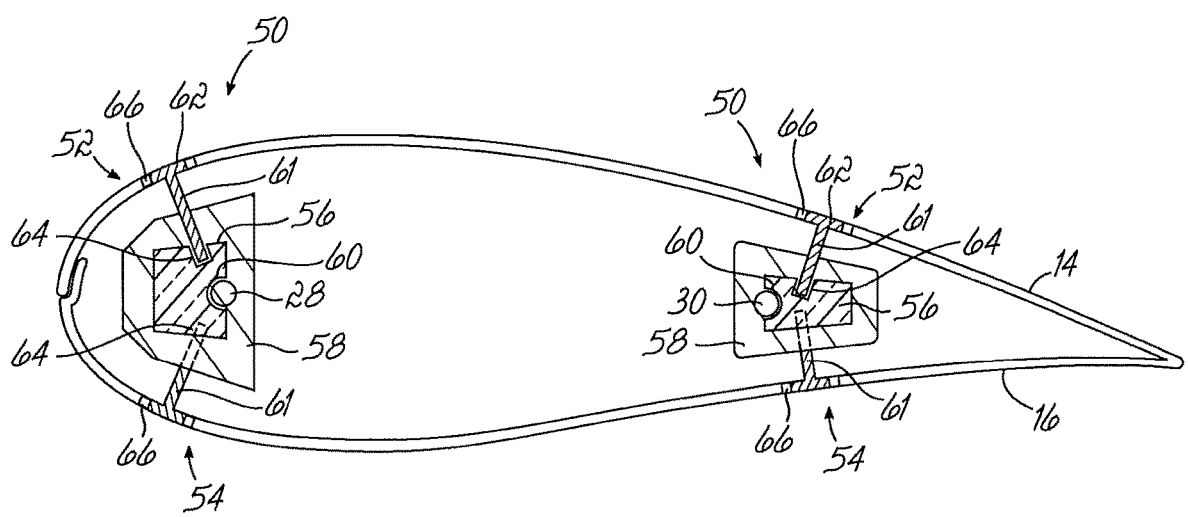
FIG. 4 is a section through the turbine blade in FIG. 2 along the line B-B.

With reference now to FIG. 4, which shows the structure of the receptor components 50 and the receptor elements 52, 54 in more detail, each of the receptor components 50 includes a block-like receptor base 56 and an insulating member 58 that encapsulates the receptor base 56.

The receptor base 56 is conductive, and preferably brass. The insulating member 58 is moulded directly to the receptor base 56 and so serves to suppress the initiation of leaders from the receptor base 56 during highly charge environmental conditions, which thereby guards against a lightning strike directly onto the receptor base 56 rather than on a receptor element 52, 54. Each receptor base 56 include a corresponding recess 60 through which the down conductors 28, 30 are routed so as to connect the receptor bases 56 into the down conducting system 26. Therefore, the encapsulation of the receptor bases 56 also encapsulates the junction between the down conducting system and the receptor bases 56. The insulating members 58 are formed of a suitable polymer having a high dielectric strength, and it is envisaged that the insulating members will be polyurethane, although other insulating materials are acceptable.

The insulating members 58 are sandwiched between an interior of the leeward surface 14 and an interior of the windward surface 16. Adhesive (not shown) is located between the insulating members 58 and the interiors of the leeward and windward surfaces 14, 16 to bond the insulating members to the interior of the blade. It should be appreciated that FIG. 4 shows a cross section through the insulating members 58 and that the receptor bases 56 are fully encapsulated by the insulating members 58. The insulating members 58 may have a width in the span-wise direction of around 15 cm.

Although not shown in FIG. 4, the receptor components 50 may also be installed in suitable locations within the interior of the blade 2 by spacing elements that space and hold each of the receptor components 50 in a predetermined position relative to the blade shell.

As mentioned, each receptor base 56 connects to two receptor elements 52, 54: one on each of the leeward and windward surfaces 14, 16 of the blade 2. This arrangement reduces the number of receptor bases required which reduces the cost and weight of the blade as a whole. In addition, the receptor bases only need to be installed in one of the blade half-shells during blade assembly which speeds up the fabrication time and simplifies the fabrication process. The receptor components 50 are attached to the blade half shell by adhesive, such as an epoxy adhesive.

Each receptor element 52, 54 is in the form of a bolt having a shank 61 and a head 62. The shank 61 extends into the blade 2 engages into a socket 64 in the receptor base 56. The head 62 lies against and is countersunk into the blade shell so that an upper face of the head 62 is flush with the surrounding surface of the blade 2. Like the receptor elements 44 provided on the blade tip assembly 24, the receptor elements 52, 54 of the tip receptor array 22 are also provided with a polymeric collar 66 to guard against surface flashovers during a lightning strike. The protection collar additionally provides protection against collateral heat damage to the blade skin during a lightning strike to the receptor.

Since the receptor components 50 are installed in region of the blade 2 that has a relatively shallow depth, preferably the receptor elements 52, 54 are joined to the receptor bases 56 offset from one another or 'staggered' in a spanwise direction of the blade, as is shown in FIG. 4. This avoids the shanks 60 of opposing receptor elements 52, 54 contacting one another when installed.

In the embodiment of FIG. 4, the receptor component 50 includes a single-piece receptor base 56 which connects to two receptor elements 52, 54 provided on the leeward and windward surfaces 14, 16 of the blade 2. Different configurations of receptor components are envisaged, and one such example will now be described with respect to FIG. 5.

Figure 5:
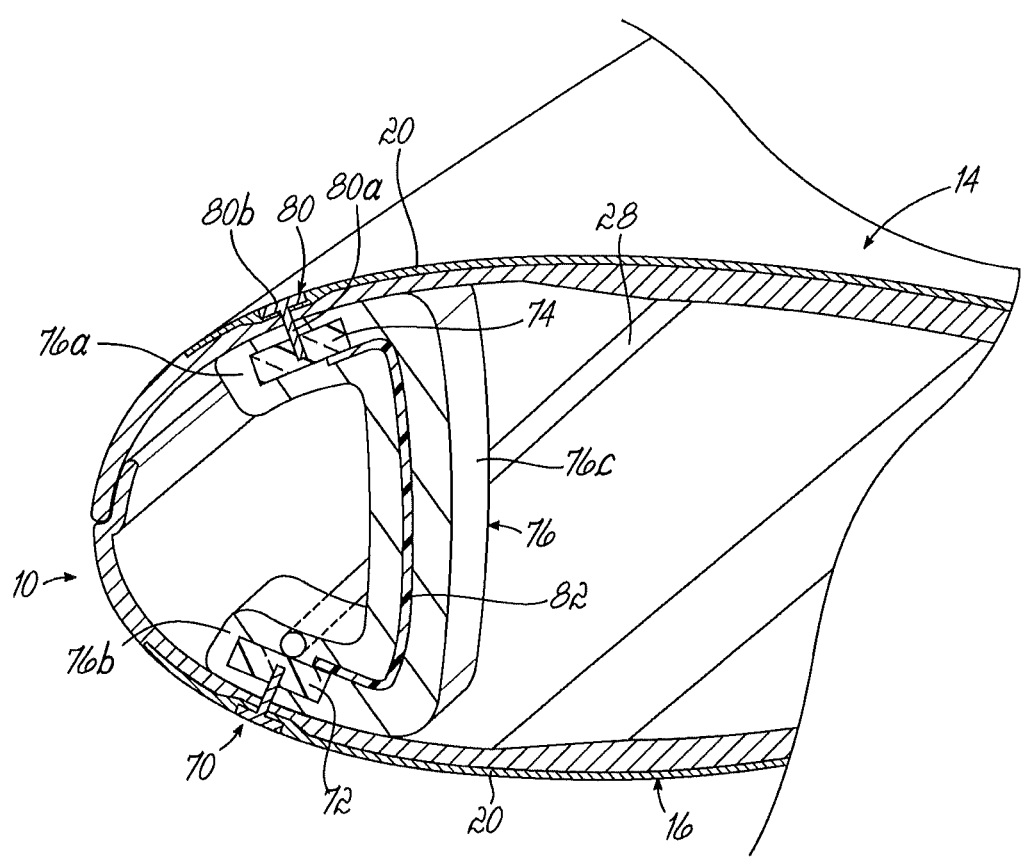
FIG. 5 is a section view of the leading edge of the turbine blade in FIG. 1 along the line C-C.

FIG. 5 is a cross-section through the blade 2 in FIG. 1 along the line C-C, and therefore illustrates a section of the surface protection layer 20 as described above.

As has been discussed, the surface protection layer 20 includes a conductive screen that provides a relatively large surface area to capture lightning strikes, from where the energy can be channelled safely into the down conducting system 26 without causing damage to the non-conductive composite structure of the blade 2. Note that the surface protection layer 20 is provided on both leeward and windward surfaces 14, 16 of the blade 2.

In order to connect the surface protection layer 20 to the down conducting system 26, a set of receptor components 70 are provided. There are four receptor components in total, one at each corner of the surface protection layer 20, although only one of the receptor components 70 is shown in FIG. 5.

In FIG. 5, the receptor component 70 is positioned adjacent the leading edge 10 of the blade 2. The receptor component 70 is shaped to fill more effectively the volume in the relatively deep profile of this region of the blade 2, compared with the relatively shallow profile in the region of the tip receptor array 22.

The receptor component 70 comprises first and second receptor bases 72, 74 that are encapsulated by an insulating member 76 that is generally annular in form. More specifically, the insulating member 76 in this embodiment is C-shaped, being defined by first and second arm portions 76a, 76b that extend from each end of a yoke portion 76c. Each of the receptor bases 72, 74 is encapsulated by a respective one of the arm portions 76a, 76b and in this manner the receptor bases 72, 74 are located in a predetermined position against a respective leeward 14 and windward surface 16 of the blade 2.

A first receptor element 80 electrically couples the surface protection layer 20 on the windward surface 16 to the first receptor base 72. In a similar manner to the embodiments discussed above, the receptor element 80 is in the form of a bolt having a shank 80a and a head 80b: the shank 80a extending through the blade 2 and engaging with the first receptor base 72; the head 80b being arranged to lie flush with the surrounding surface of the surface protection layer 20. An identical arrangement is provided to couple the surface protection layer 20 on the leeward surface 14 to the second receptor base 74.

A conductive link 82 is provided to electrically connect the first receptor base 72 to the second receptor base 74 and, in this embodiment, the conductive link 82 is a zinc coated copper braided wire. Although braided wire is not essential, it is useful from a manufacturing perspective since it is flexible and so can be suitably shaped to extend between the first and second receptor bases 72, 74 prior to encapsulation.

The insulating member 76 is sandwiched between an interior of the leeward surface 14 and an interior of the windward surface 16. Adhesive (not shown) is located between the insulating member 76 and the interiors of the leeward and windward surfaces 14, 16 to bond the insulating member to the interior of the blade. It should be appreciated that FIG. 5 shows a cross section through the insulating member 76 and that the first receptor base 72, the second receptor base 74 and the conductive link 82 are fully encapsulated by the insulating member 76. The insulating member 76 may have a width in the span-wise direction of around 15 cm.

Figure 6:
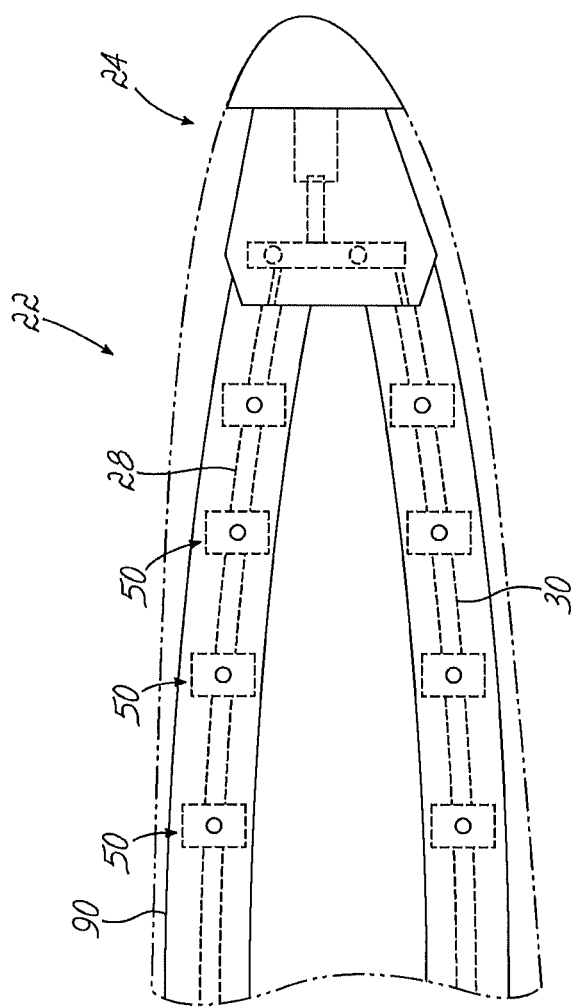
FIG. 6 is a view of a blade region like that in FIG. 2, but shows an alternative embodiment of the lightning protection sub-system.

Connection is made to the down conducting system 26 by welding the first receptor base 72 to a corresponding down conductor, which as illustrated is the first down conductor 28 near the leading edge 10 of the blade 2. For efficient assembly, the conductive link 82 and the down conductor 28 may be arranged in a predetermined pattern with respect to the first and second receptor bases 72, 74 and connected thereto by exothermic welding to ensure the electrical integrity of the connection prior to casting the insulating member 76 around the components. In this way, the receptor component 70 becomes installable as a unit together with the down conducting system 26. Welding is one option for connecting the electrical components although other suitable techniques such as mechanical clamping are acceptable In a variation of this, it is envisaged that the down conducting system 26 including both the first and second down conductors 28, 30 may be insulated as a unit with the receptor components 50 associated with the tip receptor array 22 as well as the receptor components 70 associated with the surface protection layer 20. FIG. 6 illustrates this, and it can be seen that the first and second down conductors 28, 30 and the receptor components 50 associated with the tip receptor array 22 are encapsulated by an elongate insulating element 90 that forms a unitary insulating housing. The insulating element 90 may take the place of the insulating elements 58 of the receptor bases 56, although currently it is envisaged that the insulating element 90 will be a further insulating measure in addition to the encapsulated receptor bases 56 and also the corona-reducing shielding of the down conductors 28, 30. In this embodiment, therefore, the entire electrical system within the blade 2 can be fully encapsulated prior to installation and can be installed as a single unit, rather like a wiring loom, into a blade half-shell during the blade lay-up phase. The encapsulation of the down conducting system 26 in an electrically isolating polymer reduces the probability of lightning strike attachment directly to the down conductors 28, 30 by increasing the dielectric breakdown strength of the system The first and second down conductors 28, 30 are themselves high voltage corona inhibiting cable insulated cables, insulated with either a cross linked polymer or silicone rubber. These insulated cables are then encapsulated into the elongate insulating element 90.

The insulating element 90 can be formed from polyurethane. In a particular embodiment, the stiffness of the polyurethane can vary along the length of the blade so that the down conducting system 26 has more flexibility in some parts of the blade than others. For example, it is desirable for the insulating element 90 to be flexible in the tip region of the blade where the blade deflects the most under wind loads, whereas towards the root of the blade the insulating element 90 can be stiffer.

The skilled person will appreciate that variations may be made to the illustrated embodiments without departing from the inventive concept, as described by the claims. Some variations to the illustrated embodiments have been discussed above. Others will now be explained.

The invention is described in the context of a turbine blade having a so-called 'structural shell' construction, in which longitudinal carbon ribs or pultrusions are integrated into the upper and lower shell-halves during the lay-up phase. However, the invention is also applicable to blades constructed according to a different design philosophy such as a structural spar construction.

The blade tip assembly 24 has been described as including a blade tip module 32 of solid metal. Although this is preferred for reasons of conductivity and resilience to blade strikes, it could also be formed from a non-conductive core having a conductive outer layer, although robustness may be adversely affected.

In the insulating arrangement described above, the insert member 34 is described as single part. However, it should be appreciated that it could also be fabricated from multiple parts.

In the above embodiments, it has been described that the blade is divided into three zones, A, B, and C, for the purposes of lightning protection. It will be appreciated that this is merely an example of how a blade may be configured for lightning protection and is not intended to be limited. For example, a blade may be configured so that zone A is omitted. In effect, therefore, the blade is protected along its entire length instead of leaving a zone relatively unprotected from lightning strikes.

The invention claimed is:

1. An electrical system for a wind turbine blade, comprising:
    a down conductor; and
    a blade tip assembly coupled to the down conductor, the blade tip assembly comprising:
        a conductive blade tip module;
        a coupler extending from the conductive blade tip module;
        a lightning receptor arrangement electrically coupled to the down conductor and spaced from the conductive blade tip module, wherein the coupler electrically couples the conductive blade tip module to the lightning receptor arrangement; and
        an insulating member that encases the coupler, the lightning receptor arrangement, and a portion of the down conductor,
    wherein at least the coupler, lightning receptor arrangement, insulating member, and down conductor of the electrical system comprise an assembled, self-contained unit for placement in a wind turbine blade or a wind turbine blade mould.

2. The electrical system of claim 1, wherein the coupler is detachable from the blade tip module.

3. The electrical system of claim 1, wherein the coupler is receivable in a cavity defined in the conductive blade tip module.

4. The electrical system of claim 1, wherein the coupler is in the form of an elongated plate.

5. The electrical system of claim 1, wherein the insulating member is moulded to the coupler.

6. The electrical system of claim 1, wherein the insulating member includes an aerofoil profile in a chord-wise section.

7. The electrical system of claim 1, wherein the insulating member is polyurethane.

8. The electrical system of claim 1, wherein the conductive blade tip module is a solid metal tip.

9. The electrical system of claim 1, wherein the lightning receptor arrangement includes a conductive receptor base, to which a lightning receptor element is attachable.

10. The electrical system of claim 9, wherein the conductive receptor base is brass.

11. The electrical system of claim 9, wherein the conductive receptor base is plate-like in form.

12. The electrical system of claim 11, wherein the conductive receptor base extends transverse to a longitudinal axis of the blade tip assembly.

13. The electrical system of claim 1, wherein the coupler includes a conductive link connected between the lightning receptor arrangement and the conductive blade tip module.

14. The electrical system of claim 13, wherein the conductive link is a cable.

15. The electrical system of claim 1, wherein the insulating member extends between the lightning receptor arrangement and the conductive blade tip module.

16. The electrical system of claim 1, wherein the insulating member is a single block that encases at least part of the coupler and at least part of the lightning receptor arrangement.

17. A wind turbine blade assembly comprising the electrical system of claim 1, and a wind turbine blade comprising a windward shell and a leeward shell.

18. The wind turbine blade assembly of claim 17, wherein the insulating member is sandwiched between the windward shell and the leeward shell.

19. The wind turbine blade assembly of claim 17, wherein the insulating member extends in a chordwise direction from a leading edge of the blade towards a trailing edge of the blade, and in a spanwise direction from the conductive blade tip module towards a root of the blade.

20. A method for assembling an electrical system for a wind turbine blade, the method comprising:
    providing a blade tip module;
    providing a lightning receptor arrangement spaced from the blade tip module; and
    providing a down conductor;

connecting the lighting receptor arrangement to the blade tip module via a coupler;

connecting the down conductor to the lightning receptor arrangement; and with the electrical system outside the wind turbine blade or wind turbine blade mould, encasing the coupler, the lightning receptor arrangement, and a portion of the down conductor in an insulating member so that at least the coupler, lightning receptor arrangement, insulating member, and down conductor form an assembled, self-contained unit.

21. The method of claim 20, wherein the coupler is removably attached to the blade tip module.

22. An electrical system for a wind turbine blade having an interior cavity defined by a blade shell, the electrical system comprising:

a down conductor;

a blade tip assembly comprising a coupler electrically connected to a receptor arrangement that is electrically connected to the down conductor, the coupler configured to be connected to a conductive blade tip of the blade tip assembly; and a pre-formed insulating member configured to be received in the interior cavity of the wind turbine blade adjacent a tip of the blade;

wherein the pre-formed insulating member encases the coupler, the receptor arrangement and a portion of the down conductor, wherein the receptor arrangement is configured to be spaced from the conductive blade tip module when the conductive blade tip module is attached to the coupler, and wherein at least the coupler, lightning receptor arrangement, insulating member, and down conductor of the electrical system are pre-assembled and configured as a pre-manufactured unit.

23. The electrical system of claim 22, wherein the pre-manufactured unit is positionable within the wind turbine blade subsequent to the manufacture of the blade.

24. The electrical system of claim 22, wherein the pre-manufactured unit is positionable within a blade mould during manufacture of the wind turbine blade.

25. A method of manufacturing a wind turbine blade, comprising:

providing a wind turbine blade mould;

positioning glass fibre layers in the mould to form a blade skin of the wind turbine blade;

moulding the wind turbine blade; and coupling the electrical system of claim 22 to the blade.

26. The method of claim 25, wherein the coupling step occurs after moulding the wind turbine blade.

27. The method of claim 25, further comprising positioning the electrical system within the blade mould prior to moulding the wind turbine blade such that the electrical system is coupled to the blade during manufacture of the blade.

28. The method of claim 25, further comprising attaching the blade tip module to the coupler of the blade tip assembly.

* * * * *